(12) United States Patent
Petrenko

(10) Patent No.: US 7,087,876 B2
(45) Date of Patent: Aug. 8, 2006

(54) HIGH-FREQUENCY MELTING OF INTERFACIAL ICE

(75) Inventor: Victor F. Petrenko, Lebanon, NH (US)

(73) Assignee: The Trustees of Dartmouth College, Hanover, NH (US)

(*) Notice: Subject to any disclaimer, the term of this patent is extended or adjusted under 35 U.S.C. 154(b) by 275 days.

(21) Appl. No.: 09/976,210

(22) Filed: Oct. 11, 2001

(65) Prior Publication Data

US 2002/0092849 A1 Jul. 18, 2002

Related U.S. Application Data

(60) Continuation-in-part of application No. PCT/US00/05665, filed on Mar. 1, 2000, application No. 09/976,210, and a continuation-in-part of application No. PCT/US99/28330, filed on Nov. 30, 1999, application No. 09/976,210, and a continuation-in-part of application No. PCT/US99/25124, filed on Oct. 26, 1999, and a continuation-in-part of application No. 09/426,685, filed on Oct. 25, 1999, which is a division of application No. 09/094,779, filed on Jun. 15, 1998, now Pat. No. 6,027,075.

(60) Provisional application No. 60/299,693, filed on Jun. 20, 2001, provisional application No. 60/262,775, filed on Jan. 19, 2001, provisional application No. 60/122,463, filed on Mar. 1, 1999, provisional application No. 60/131,082, filed on Apr. 26, 1999, provisional application No. 60/110,440, filed on Dec. 1, 1998, provisional application No. 60/122, 463, filed on Mar. 1, 1999, provisional application No. 60/131,082, filed on Apr. 26, 1999, and provisional application No. 60/105,782, filed on Oct. 27, 1998.

(51) Int. Cl.
*H05B 6/54* (2006.01)

(52) U.S. Cl. ............... 219/770; 219/780

(58) Field of Classification Search .......... 219/770, 219/780, 772, 497, 209, 644, 635; 310/321, 310/322, 323.21; 244/134 R, 134 D, 134 F, 244/138 R; 174/110 R, 102 R, 115, 128.1; 205/628, 630; 204/242; 206/317, 589

See application file for complete search history.

(56) References Cited

U.S. PATENT DOCUMENTS

| 1,157,344 | A | | 10/1915 | Thomson |
| 1,656,329 | A | | 1/1928 | Sievert et al. |
| 2,496,279 | A | | 2/1950 | Ely et al. |
| 2,870,311 | A | | 1/1959 | Greenfield. |
| 2,947,841 | A | * | 8/1960 | Pickles et al. ............... 219/644 |
| 3,204,084 | A | | 5/1963 | Spencer, Jr. |

(Continued)

FOREIGN PATENT DOCUMENTS

| CN | 1079578 | 12/1993 |
| DE | 44 40 634 | 7/1966 |
| EP | 1168888 | 1/2002 |
| FR | 2570333 | 3/1986 |
| GB | 2 252 285 A | 8/1992 |
| GB | 2259287 | 3/1993 |

(Continued)

OTHER PUBLICATIONS

"Icing Wind Tunnel" Meeting the Challenges of Ice Testing In a World-Class Facility—BF Goodrich Aerospace Ice Protection Systems, 4 pages.

(Continued)

*Primary Examiner*—Quang T. Van
(74) *Attorney, Agent, or Firm*—Lathrop & Gage LC

(57) ABSTRACT

An alternating electric field is applied at an ice interface to generate a resistive AC current having a frequency greater than 1000 Hz in interfacial ice. Typically, a first electrode and a second electrode proximate to the interface are separated by an interelectrode distance of about 50 μm to 500 μm. An AC power source provides a voltage of about 10 to 500 volts across the electrodes in order to create the alternating electric field. Interfacial ice converts capacitive AC current into resistive AC current, which generates Joule heat in the interfacial ice.

21 Claims, 4 Drawing Sheets

U.S. PATENT DOCUMENTS

| | | | |
|---|---|---|---|
| 3,526,920 A | | 6/1966 | Byers |
| 3,316,344 A | | 4/1967 | Kidd et al. |
| 3,316,345 A | | 4/1967 | Toms et al. |
| 3,790,752 A | | 2/1974 | Boaz et al. |
| 3,825,371 A | | 7/1974 | Roder et al. |
| 3,835,269 A | | 9/1974 | Levin et al. |
| 3,915,883 A | | 10/1975 | vanMeter et al. |
| 3,971,056 A | | 7/1976 | Jaskolski et al. |
| 4,054,672 A | * | 10/1977 | Inoue et al. ............... 426/244 |
| 4,082,962 A | | 4/1978 | Burgsdorf et al. |
| 4,085,338 A | | 4/1978 | Genrikh et al. |
| 4,137,447 A | | 1/1979 | Boaz |
| 4,190,137 A | | 2/1980 | Shimada et al. |
| 4,278,875 A | | 7/1981 | Bain |
| 4,296,298 A | | 10/1981 | Macmaster et al. |
| 4,321,296 A | | 3/1982 | Rougier |
| 4,330,702 A | | 5/1982 | Cheng |
| 4,330,703 A | | 5/1982 | Horsma et al. |
| 4,376,598 A | | 3/1983 | Brows et al. |
| 4,638,960 A | | 1/1987 | Straube et al. |
| 4,651,825 A | | 3/1987 | Wilson |
| 4,690,353 A | | 9/1987 | Haslim et al. |
| 4,732,351 A | * | 3/1988 | Bird .................. 244/134 D |
| 4,737,618 A | | 4/1988 | Barbier et al. |
| 4,760,978 A | | 8/1988 | Schuyler et al. |
| 4,773,976 A | | 9/1988 | Vexler |
| 4,814,546 A | | 3/1989 | Whitney et al. |
| 4,875,644 A | | 10/1989 | Adams et al. |
| 4,887,041 A | | 12/1989 | Mashikian et al. |
| 4,895,322 A | * | 1/1990 | Zieve .................... 244/134 R |
| 4,897,597 A | | 1/1990 | Whitener |
| 4,950,950 A | | 8/1990 | Perry et al. |
| 4,974,503 A | * | 12/1990 | Koch ..................... 99/451 |
| 4,985,313 A | | 1/1991 | Penneck et al. |
| 5,012,868 A | | 5/1991 | Bridges |
| 5,109,140 A | | 4/1992 | Nguyen |
| 5,112,449 A | | 5/1992 | Jozefowicz et al. |
| 5,143,325 A | * | 9/1992 | Zieve et al. ............ 244/134 D |
| 5,144,962 A | | 9/1992 | Counts et al. |
| 5,172,024 A | * | 12/1992 | Broussoux et al. .... 310/323.21 |
| 5,218,472 A | | 6/1993 | Jozefowicz et al. |
| 5,330,291 A | | 7/1994 | Heath et al. |
| 5,344,696 A | | 9/1994 | Hastings et al. |
| 5,389,766 A | * | 2/1995 | Takahashi et al. ......... 219/635 |
| 5,398,547 A | | 3/1995 | Gerardi et al. |
| 5,411,121 A | | 5/1995 | La Forte et al. |
| 5,441,305 A | | 8/1995 | Tabar |
| 5,496,989 A | | 3/1996 | Bradford et al. |
| 5,511,288 A | | 4/1996 | Geraldi et al. |
| 5,523,959 A | | 6/1996 | Seegmiller |
| 5,551,288 A | | 9/1996 | Geraldi et al. |
| 5,555,736 A | | 9/1996 | Willis et al. |
| 5,586,213 A | | 12/1996 | Bridges et al. |
| 5,630,360 A | * | 5/1997 | Polny, Jr. .................... 99/451 |
| 5,744,704 A | | 4/1998 | Hu et al. |
| 5,861,855 A | | 1/1999 | Arsenault et al. |
| 5,873,254 A | | 2/1999 | Arav |
| 5,902,962 A | | 5/1999 | Gazdzinski |
| 5,947,418 A | | 9/1999 | Bessiere et al. |
| 6,018,152 A | | 1/2000 | Allaire et al. |
| 6,027,075 A | | 2/2000 | Petrenko |
| 6,031,214 A | | 2/2000 | Bost et al. |
| 6,102,333 A | | 8/2000 | Gerardi et al. |
| 6,129,314 A | | 10/2000 | Giamati et al. |
| 6,134,096 A | | 10/2000 | Yamada et al. |
| 6,145,787 A | | 11/2000 | Rolls |
| 6,194,685 B1 | | 2/2001 | Rutherford |
| 6,218,647 B1 | | 4/2001 | Jones et al. |
| 6,239,601 B1 | * | 5/2001 | Weinstein .................. 324/662 |
| 6,270,188 B1 | | 8/2001 | Ichikawa |
| 6,330,986 B1 | | 12/2001 | Rutherford et al. |
| 6,370,004 B1 | | 4/2002 | Yamaguchi |
| 6,396,172 B1 | | 5/2002 | Couture |
| 6,427,946 B1 | | 8/2002 | Petrenko |
| 6,478,259 B1 | | 11/2002 | Cordaro |
| 6,492,629 B1 | | 12/2002 | Sopory |
| 6,550,508 B1 | | 4/2003 | Yamaguchi et al. |
| 6,570,333 B1 | | 5/2003 | Miller et al. |
| 6,576,115 B1 | | 6/2003 | Petrenko |

FOREIGN PATENT DOCUMENTS

| | | |
|---|---|---|
| JP | 57060684 | 4/1982 |
| JP | 5292638 | 11/1993 |
| JP | 7023520 | 1/1995 |
| JP | 11041768 | 2/1999 |
| SU | 26363 | 8/1931 |
| SU | 587548 | 1/1978 |
| SU | 936040 | 6/1982 |
| WO | WO 94/20819 | 9/1994 |
| WO | WO 95/30495 | 11/1995 |

OTHER PUBLICATIONS

"New Goodrich Wind Tunnel Tests Advanced Aircraft De–Icing Systems", by Edward H. Phillips, Uniontown, Ohio, Aviation Week Magazine, Oct. 3, 1998, 3 pages.

"The Evolution of Ice Protection Creates a Revolution Ice Detection", BFGoodrich Aerospace Ice Protection Systems, 2 pages, No date.

AIA 94–0714, "Interface Influences Upon Adhesion to Airfoil Materials", by A. Reich, BF Goodrich Aerospace/De- –Icing Systems, Brecksville/Uniontown, OH (32nd Aerospace Sciences Meeting and Exhibit, Jan. 10(–13, 1994) PP. 1–8.

Electrochemical Phenomena in Ice; Victor F. Petrenko; Thayer School of Engineering Special Report 96–2; Feb. 1996.

Generation of electric fields by ice and snow friction, by Victor F. Petrenko and Samuel C. Colbeck, (May 1, 1995), pp. 4518–4521.

Khusnatdinov N N et al: "Electrical Properties Of The Ice/Solid Interface" Journal Of Phusical Chemistry, B, Materials, Surfaces, Interfaces And Biophysical, Washington, D.C. US vol. 101, Jul. 17, 1997, pp. 6212–6214.

The effect of static electric fields on ice friction; Victor F. Petrenko; J. Appl. Phys. 76(2), Jul. 15, 1994; 1994 American Institute of Physics.

* cited by examiner

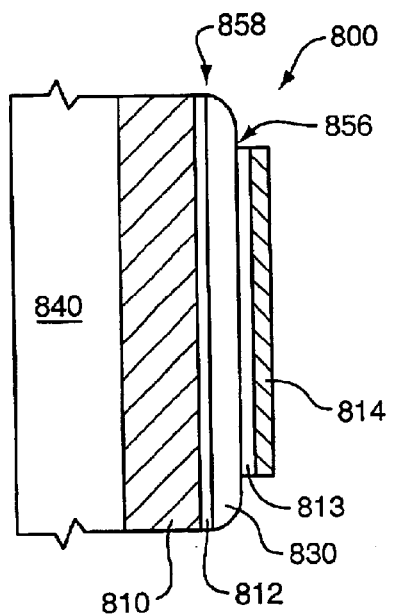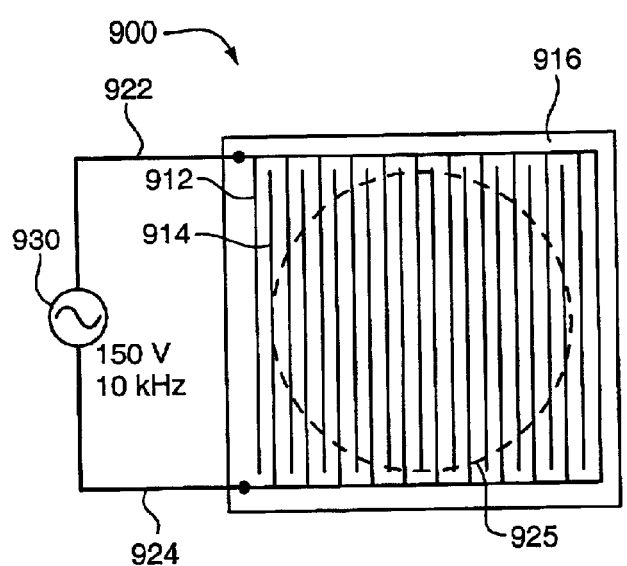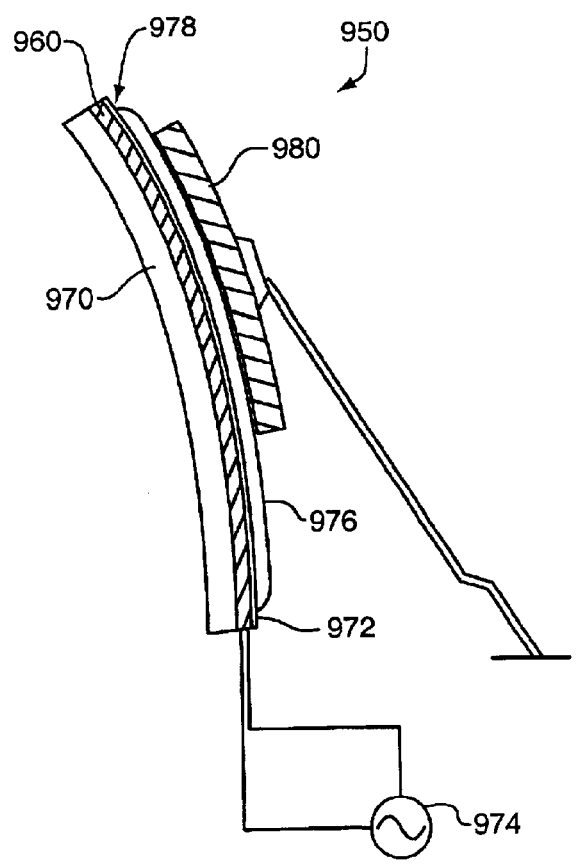
FIG. 8
FIG. 9
FIG. 10

HIGH-FREQUENCY MELTING OF INTERFACIAL ICE

RELATED APPLICATIONS

This application claims the benefit of U.S. provisional application Serial No. 60/299,693, filed Jun. 20, 2001, and of U.S. provisional application Serial No. 60/262,775, filed Jan. 19, 2001. This application is also a continuation-in-part application of commonly-owned and copending U.S. patent application Ser. No. 09/426,685, filed Oct. 25, 1999, which is a divisional application of U.S. patent application Ser. No. 09/094,779, filed Jun. 15, 1998, issued as U.S. Pat. No. 6,027,075 on Feb. 22, 2000; and this application is also a continuation-in-part application of commonly-owned and copending PCT application PCT/US00/05665, filed 1Mar. 2000, which claimed the benefit of U.S. provisional application Serial No. 60/122,463, filed Mar. 1, 1999, now abandoned, and provisional application Serial No. 60/131,082, filed Apr. 26, 1999, now abandoned, and which is a continuation-in-part application of commonly-owned and copending PCT application PCT/US99/28330, filed 30Nov. 1999, which claims the benefit of U.S. provisional application Serial No. 60/110,440, filed Dec. 1, 1998, now abandoned, the benefit of U.S. provisional application Serial No. 60/122,463 filed Mar. 1, 1999, now abandoned, and the benefit of U.S. provisional application Serial No. 60/131,082 filed Apr. 26, 1999, now abandoned; and this application is also a continuation-in-part application of commonly-owned and copending PCT application PCT/US99/25124, filed 26Oct. 1999, which claims the benefit of U.S. provisional application Serial No. 60/105,782, filed 27Oct. 1998, now abandoned, each of which is hereby incorporated by reference.

GOVERNMENT LICENSE RIGHTS

The U.S. Government has certain rights in this invention as provided for by the terms of Grant No. DAAH 04-95-1-0189, awarded by the Army Research Office, and of Grant No. MSS-9302792, awarded by the National Science Foundation.

FIELD OF THE INVENTION

The invention is related to the field of ice adhesion, specifically, to decreasing the adhesion strength of ice to surfaces of solid objects, in particular, to windshields, windows and other objects.

BACKGROUND OF THE INVENTION
Statement of the Problem

Ice adhesion to certain surfaces causes various types of problems. For example, ice accumulation on aircraft wings endangers the plane and its passengers. Accumulations of ice formed by the condensation and freezing of water on the outside surfaces of heat exchangers in freezers reduces heat transfer efficiency and often results in physical damage to cooling coils. Ice on ship hulls causes navigational difficulties, expenditure of additional power to navigate through water and ice, and unsafe conditions. Problems associated with ice are particularly obvious with respect to land-based surfaces in transportation systems, including roads and highways, bridges, parking lots, sidewalks, airport runways, train tracks. Ice on roads and bridges is frequently a cause of automobile accidents resulting in personal injury and death, as well as material damage. Ice on airport runways causes delays in air traffic. Large amounts of material resources, money and man-hours are spent annually to remove ice and snow from roads and other transportation-related surfaces to clear them for use and to reduce risks of slipping and skidding on iced surfaces. Ice on windshields and windows of motor vehicles decreases driver visibility and safety.

Conventional resistive heating systems to remove ice and snow have high, sometimes economically unfeasible, power requirements. Application of chemical agents to remove ice has temporary effects, is limited to relatively small surface areas, and is labor and equipment intensive. Also, once ice has formed on surfaces, it may be difficult to remove.

SUMMARY OF THE INVENTION

The invention helps to solve some of the problems mentioned above by providing systems and methods for melting interfacial ice at an ice interface. Systems and methods in accordance with the invention are particularly applicable for alleviating optical interference associated with the presence of ice on transparent surfaces, such as windows and windshields. Nevertheless, systems and methods in accordance with the invention are generally applicable for removing ice, in particular for deicing surfaces of solid objects.

In certain aspects, a system for melting interfacial ice includes: a first electrode and a second electrode, the first electrode and the second electrode defining an interelectrode space between the first electrode and the second electrode. The first electrode and the second electrode also define an interelectrode distance that separates the first electrode and the second electrode. Typically, a system in accordance with the invention is utilized to melt interfacial ice located at an ice-solid interface. Therefore, the first electrode and the second electrode typically are located proximate to a surface of a solid to be protected against ice. In certain aspects, an electrical insulator is disposed in the interelectrode space. For example, in certain embodiments, a nonconductive rubber windshield wiper blade is located in the interelectrode space. In certain aspects, a system further includes an AC power source for providing an AC voltage across the first and second electrodes. Typically, an AC power source provides an AC voltage in a range of about from 10 volts to 500 volts. Preferably, the AC voltage has a frequency greater than 1000 Hz. Typically, the ice-solid interface is located in the interelectrode space.

The interelectrode distance typically has a value in a range of about from 50 µm to 500 µm. In certain embodiments, the interelectrode distance has a value less than 50 µm since an interelectrode distance as small as possible is preferred. In other embodiments, the interelectrode distance has a value greater than 500 µm.

In certain aspects, a method in accordance with the invention includes applying an alternating electric field ("AEF") to interfacial ice at an ice-solid interface of surfaces being protected. The alternating electric field contains capacitive AC energy. The interfacial ice absorbs a portion of the capacitive energy of the AEF, converting it into conductivity (resistive) AC current. Passing through ice, the AC current generates Joule electric heat, which melts a very thin layer of interfacial ice at the ice-solid interface. The Joule heating power is:

$$W_h = \rho_{ice} j^2 \tag{1}$$

where $W_h$ is the heating power per m³, $\rho_{ice}$ is ice electric resistivity, and j is the current density.

When an interfacial layer of ice melts, the resistivity of ice, $\rho_{ice}$, in equation (1) is replaced by the resisivity of water, $\rho_W$, which is 2 to 4 orders of magnitude less than that of ice. As a result, the heating power, $W_h$, dramatically decreases, the interface re-freezes, and the heating power rises again, re-melting the interfacial ice. This self-adjusted mechanism minimizes the total power needed to melt interfacial ice.

A second advantage of the technique as compared to conventional heaters is that the heating power, $W_h$, is generated directly where it is needed, on the ice windshield interface. Thus, there is no part of the structure that needs to be heated over 0° C. As a result, less heating power sinks into the environment, thus decreasing heating power requirements. Moreover, when ice adhesion to a windshield (or to an airplane wing or other surface) is eliminated or decreased by melting of interfacial ice, then it is easily removed by gravity, by scraping or by air flow drag. As a result, the heating power, $W_h$, drops to zero because the water is also usually swept away or evaporated. Power consumption in methods and systems in accordance with the invention is only about 1/10 or less of the power consumption in systems using conventional resistive heating.

BRIEF DESCRIPTION OF THE DRAWINGS

A more complete understanding of the invention may be obtained by reference to the drawings, in which:

FIG. 8 depicts a further embodiment containing an electrical insulator located on top of the first electrode, and a second insulator in the form of a nonconductive rubber windshield-wiper blade;

FIG. 9 depicts an exemplary system in accordance with the invention with interdigitated electrodes that melted an ice disc;

FIG. 10 depicts in schematic form a system in accordance with the invention having a plurality of interdigitated electrodes in a windshield covered by an electrical insulator.

DESCRIPTION OF THE INVENTION

Figure 1:
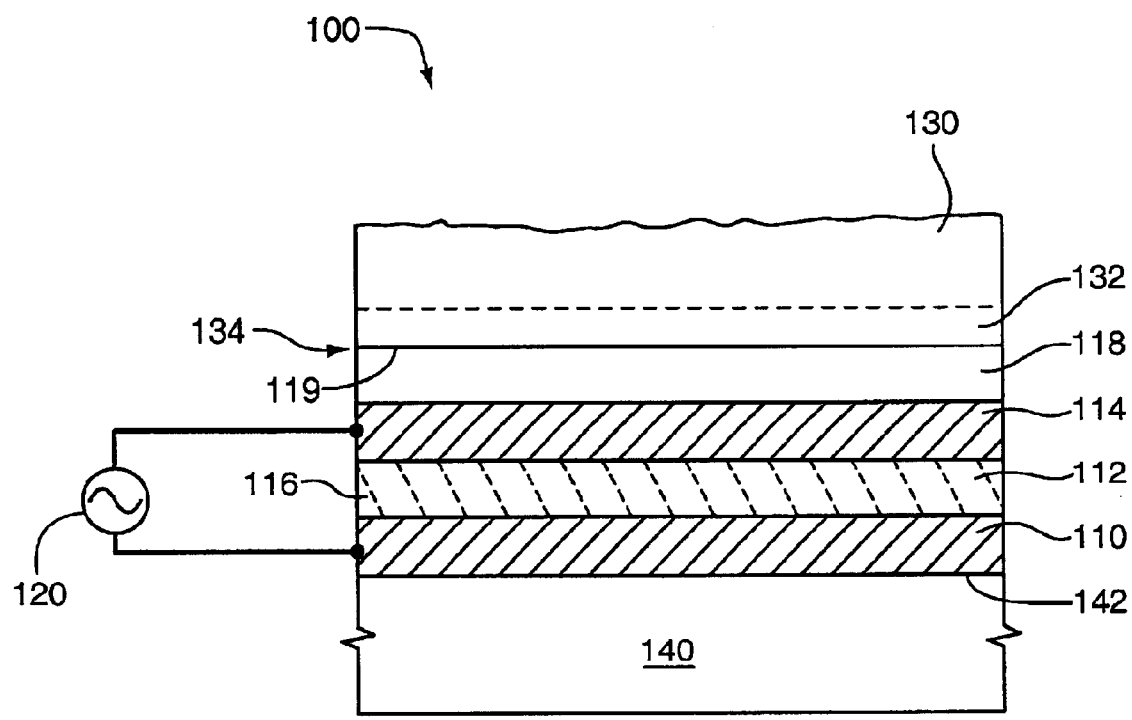
FIG. 1 depicts a generalized system in accordance with the invention in which an AC power source generates an alternating electric field at an ice-solid interface.

The invention is described herein with reference to FIGS. 1–10. It should be understood that the structures and systems depicted in schematic form in FIGS. 1–10 are used to explain the invention and are not precise depictions of actual structures and systems in accordance with the invention. Furthermore, the embodiments described herein are exemplary and are not intended to limit the scope of the invention, which is defined in the claims below.

Embodiments are described herein mainly with reference to windshields. It is understood, however, that embodiments in accordance with the invention are useful for deicing surfaces of solids in many different applications; for example, the deicing of airplane wings, ship surfaces, roads and highways, bridges, parking lots, sidewalks, airport runways, train tracks, and freezer coils, among others.

In certain aspects, embodiments in accordance with the invention include applying a high-frequency alternating electric field ("AEF") at an ice interface. Practically, the AEF usually has a frequency greater than 1000 Hz. Typically, a high-frequency AC voltage is applied across a first electrode and a second electrode in order to generate the AEF. The AC voltage and the AEF preferably have a frequency not less than 10 kHz. Typically, the ice interface is an ice-solid contact interface at the outside surface of a solid object being protected; for example, the outside surface of a windshield covered by a layer of ice. Therefore, the AEF is generated preferably at or near the ice-solid contact interface to maximize alternating electric field strength at the contact interface.

The AEF contains capacitive AC energy in the form of capacitive AC current. Ice is semiconductive at low frequencies; for example, at 50 Hz. The electrical conductivity of ice increases as AC frequency increases. Therefore, the interfacial ice absorbs a portion of the capacitive energy, converting some of the capacitive AC current into conductivity (resistive) AC current. The resistive AC current flowing through the interfacial ice generates Joule heat in the interfacial ice. The Joule heat causes the interfacial ice at the contact interface to melt. The term "contact interface" is used generally herein to denote a region in which a surface of a solid object and the surface of ice are adjacent and contiguous to each other. It is understood that an ice-solid contact interface typically includes air gaps and voids and perhaps areas occupied by a liquid-like water layer, as well as areas of actual physical contact between the solid and the ice.

For a given voltage, the heating power delivered to ice in an AEF is a function of the electrical conductivity of the ice. The conductivity of interfacial ice is significantly higher than the conductivity of bulk ice. For example, in an interdigitated circuit in which the interelectrode distance, d, is the same as the width of the interdigitated electrodes, the ratio of the surface conductance, $G_S$, to the bulk conductance, $G_B$, is $$\frac{G_s}{G_B} \approx \frac{3}{2} \cdot \frac{\sigma_s}{\sigma_B \cdot d} \quad (2)$$

where $\sigma_s$ is the conductivity at the interfacial ice surface, and $\sigma_B$ is ice bulk conductivity.

Using experimental data for pure ice at −10° C. and a value of d=$10^{-4}$ m (i.e., 100 μm) yields:

$$\frac{G_s}{G_B} = \frac{3}{2} \cdot \frac{10^{-8}}{3 \cdot 10^{-10} \cdot 10^{-4}} = 5 \cdot 10^4 \text{ at } f = 10 \text{ Hz} \quad (3)$$

and $$\frac{G_s}{G_B} = \frac{3}{2} \cdot \frac{10^{-7}}{3 \cdot 10^{-5} \cdot 10^{-4}} = 7.5 \cdot 10^3 \text{ at } f = 10 \text{ kHz} \quad (4)$$

As a result, conductivity (resistive) AC current concentrates in the interfacial ice, resulting in much higher Joule heating of interfacial ice compared to bulk ice. Thus, an advantage of the invention is that heating power is focused at the ice interface. Ice at the interface is heated and melted, with very little heat energy dissipated in the bulk ice.

Also, electrical conductivity of ice increases as the frequency of AC current passing through it increases. As conductivity increases, resistive AC current absorbed from the AEF and flowing through interfacial ice at the ice interface increases, resulting in higher heating power to melt ice. Deicing in accordance with the invention occurs at AC frequencies as low as about 100 Hz; however, such low frequencies use high voltage. Therefore, the frequency of the AEF and the AC voltage usually exceeds 1 kHz, and is preferably 10 kHz or greater. While other considerations may limit practically the frequency, from a heating standpoint, the frequency should be as high as possible. With high-frequency AC, that is, greater than 1000 Hz (1 kHz), an AC voltage in a range of about from 10 to 500 volts is usually sufficient to melt interfacial ice in accordance with the invention.

Numerous factors affect the Joule heating power generated by the capacitive energy of an AEF in interfacial ice at an ice-solid contact interface. These include, among others: ice purity (affecting conductivity); AC voltage; AC frequency; interelectrode distance; total area of electrode network; temperature; electrode structure and composition. The small interelectrode distance typically has a value in a range of about from 50 μm to 5 mm, preferably not exceeding 0.5 mm.

Melting of ice at the contact interface is usually sufficient for deicing the surfaces of a solid object because the bulk ice no longer adheres to the solid surface being protected. If the ice does not fall off the surface because of gravity, it is easily removed; for example, by the force of wind friction or by some mechanical means; for example, by a scraper or a windshield wiper. Also, since virtually all of the ice and water is removed from the region of the strong AEF, virtually no dielectric loss currents occur after melting and removal of the bulk ice. Thus, very little power is consumed after melting interfacial ice. An advantage, therefore, of a system and a method in accordance with the invention is that heating power is only used to melt interfacial ice. To melt the interfacial ice at an ice-solid interface, neither the ice nor the solid need be heated above 0° C., the melting point of ice. This significantly reduces heat transfer into the environment, compared with conventional ice-heating methods in which a heating element is heated to a temperature above the melting point. As a result, total energy consumption is minimized. Power consumption in methods and systems in accordance with the invention is only about $\frac{1}{10}$ or less of the power consumption in systems using conventional resistive heating.

A method in accordance with the invention is useful for melting interfacial ice at virtually any ice interface because electrical conductivity of interfacial ice is higher than the conductivity of bulk ice. Even within ice itself, electrical conductivity is higher along grain boundaries of polycrystalline ice because impurities in the ice tend to concentrate at grain boundaries. At an interface between ice and a non-ice material, electrical conductivity of interfacial ice is higher than that of bulk ice because non-ice material attracts conductive ions in ice to the interface. Interfacial ice on an ice-covered windshield is the ice status and contact with or adjacent to the windshield surface. Interfacial ice is also the ice exposed to and having a contact interface with air. Melting of interfacial ice at an ice-solid contact interface deices a solid surface much more efficiently than melting ice at a corresponding ice-air interface. In this specification, therefore, the term "interfacial ice" generally refers to the ice at the ice-solid contact interface at the surface of a solid object being protected against icing.

An AEF in accordance with the invention may be produced using a variety of structures and techniques. For example, commonly-owned co-pending international patent application PCT/US00/05665, filed 1Mar. 2000, discloses a system in which an alternating electric field is generated by flowing a high-frequency AC current through an electrical conductor proximate to ice being melted. This specification generally contemplates generating an AEF by providing a high-frequency AC voltage across a first electrode and a second electrode that are electrically insulated from each other. A key feature of an embodiment in accordance with the invention is a strong alternating electric field in the interfacial ice. Therefore, the stronger the potential difference between the electrodes, the stronger the alternating electric field. The term "electrically insulated" and similar terms have their general meaning that there is no electrical shorting of the first electrode and the second electrode. The terms also imply that there is no closed conductor path connecting the first and second electrodes in a closed circuit. Nevertheless, in one basic type of embodiment, the first and second electrodes are exposed to an open space that water or ice typically occupies, thereby causing some limited electrical connection between the first electrode and the second electrode. For example, in embodiments containing interdigitated first and second electrodes located on a solid nonconductive surface without a layer of insulating material, ice located directly on the interdigitated electrodes acts as a semiconductor between the electrodes. In a second basic type of embodiment, the first and second electrodes are "completely insulated" from each other so that there would be no direct electrical connection between them even if the system were completely immersed in water. In such a system, either or both of the first or second electrodes are completely insulated from any open space that can be filled by ice or water and connect the electrodes. An example is an embodiment containing interdigitated first and second electrodes located on a solid nonconductive surface, but with a layer of insulating material in direct contact with and covering all of the electrodes. In preferred embodiments in accordance with the invention, the first and second electrodes are completely insulated from each other so that air breakdown across the electrodes does not occur. Electric breakdown of air causes sparks that can damage electrode material. An insulating coating covering an electrode also protects the electrode from physical damage, such as scratching. Although there is preferably no direct conductive path between electrodes, it is understood that in a system and in a method in accordance with the invention, the capacitive energy of the AEF generates conductivity (resistive) AC current that flows in interfacial ice, producing Joule heat.

In contrast, commonly-owned and co-pending U.S. patent application Ser. No. 09/426,685 discloses a structure having two electrodes separated by an insulator, but also having an open space between the electrodes that fills with water or ice to provide electrical contact between the electrodes and to provide a path for DC current between the electrodes; that is, water or ice closes a DC circuit including the electrodes. Thus, the basic principle of operation of the invention disclosed in Ser. No. 09/426,685 is different from a system and a method in accordance with the present invention.

In FIG. 1 is depicted in schematic form a generalized system 100 in accordance with the invention. System 100 includes a first electrode 110, an electrical insulator 112, and a second electrode 114. An interelectrode space 116 is located between first electrode 110 and second electrode 114. First electrode 110 and second electrode 114 are spatially separated from each other by an interelectrode distance. As depicted in FIG. 1, electrical insulator 112 is disposed in interelectrode space 116. It should be understood that electrical insulator 112 need not occupy all of interelectrode space 116; rather, it may, in certain embodiments, be disposed in only a portion of interelectrode space 116. Electrical insulator 112 serves to insulate first electrode 110 from second electrode 114 sufficiently to prevent electrical shorting between electrodes. In other words, electrical insulator 112 maintains a potential difference between first electrode 110 and second electrode 114 when an AC voltage is applied to the electrodes. It is further understood that first electrode 110 and second electrode 114 are electrically insulated from each other in preferred embodiments in accordance with the invention. Therefore, one or more other electrical insulators (not shown in FIG. 1), in addition to electrical insulator 112, may be present in an embodiment in accordance with the invention in order to insulate first electrode 110 from second electrode 114. As depicted in FIG. 1, insulator 112 is a transparent insulating thin film, typically comprising silicon dioxide. The insulating thin film typically has a thickness in a range of from 2 to 10 μm. System 100 further comprises an insulator 118 covering second electrode 114. Transparent insulator 118 has an outer surface 119, and typically has a thickness in a range of from 2 to 10 μm. Insulator 118 protects electrode 114 against physical damage.

System 100 further includes an AC power source 120 connected to first electrode 110 and second electrode 114 for providing an AC voltage across the first and second electrodes. Preferably, AC power source 120 provides AC voltage having a frequency greater than 1000 Hz, and more preferably not less than 10 kHz. FIG. 1 further depicts a layer of ice 130 having a layer of interfacial ice 132 at an ice-solid contact interface 134 at which ice 130 is in contact with outer surface 119 of insulator 118. It is understood that in preferred embodiments in accordance with the invention, ice 130 generally is not in physical contact with either first electrode 110 or second electrode 114. An important feature is that an AC voltage across first electrode 110 and second electrode 114 provides an AEF at ice interface 134. As in system 100, preferred embodiments in accordance with the invention include an electrical insulator or protective layer exposed to ice 130. FIG. 1 shows first electrode 110 disposed on outer surface 142 of solid object 140.

In accordance with the invention, solid object 140 comprises virtually any solid object having an outer surface 142 to be protected against accumulations of ice. For example, solid object 140 may comprise, among others: an airplane wing; a helicopter blade; a ship hull, deck or superstructure; a freezer coil; the surface of a road, highway bridge or airport runway; a windshield. In some embodiments in accordance with the invention, first electrode 110 and second electrode 114 are contained within solid 140.

In FIG. 1, surface 142 is substantially horizontal. It is understood that a surface being protected in accordance with the invention may be spatially oriented in many positions different from horizontal. Terms of orientation, such as "top", "bottom", "above" and others, are used with relation to the surface being protected against ice formation. For example, with reference to FIG. 1, bottom, first electrode layer 110 is closer to surface 142 of object 140 than top, second electrode layer 114. Therefore, top electrode layer 114 is "above" bottom electrode layer 110. The term "cover" indicates that a first element that covers a second element is above the second element. For example, in FIG. 1, top, second electrode 114 covers both bottom, first electrode 110 and surface 142.

The term "proximate" and related terms as used in this specification refer to a distance between an element and an ice interface, or the distance between a place where a method step is performed and an ice interface. A key aspect of embodiments in accordance with the invention is the application of a high-frequency AEF at an ice interface so that interfacial ice absorbs capacitive energy of the AEF, converting a portion of the capacitive AC current into conductivity (resistive) AC current. Functionally, a first electrode and second electrode are proximate to an ice interface if an AC voltage across the electrodes generates an AEF having sufficient field strength to melt interfacial ice at the ice interface. Similarly, an AEF applied proximate to interfacial ice at an ice interface melts the interfacial ice. In physical terms, the term "proximate" practically means a distance within about 5 mm of an ice interface (or the solid surface on which an ice-solid interface usually occurs), preferably not exceeding 500 μm.

The term "high-frequency" in this specification refers generally to an AC frequency greater than 1000 Hz, preferably 10 kHz or greater.

Figure 2:
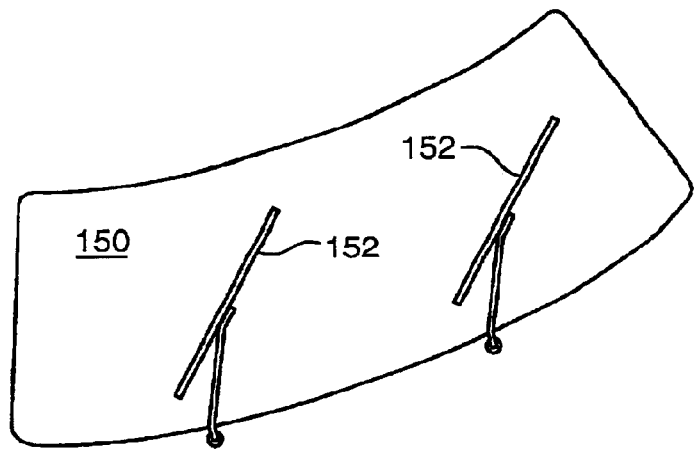
FIG. 2 depicts a windshield, which is commonly deiced by a system and a method in accordance with the invention.

A common application of a system and a method in accordance with the invention is the deicing of a windshield 150 having windshield wipers 152, such as depicted in FIG. 2. With reference to FIG. 1 and FIG. 2, solid object 140 represents nonconductive glass or other transparent windshield material of the bulk of a windshield 150. First electrode 110 is a layer of transparent, electrically conductive material. For example, first electrode 110 may comprise a layer of doped, conductive glass formed during fabrication of the windshield. Or, first electrode 110 may be a layer of transparent, conductive material deposited on the outside surface of a windshield 150. An example of a transparent conductive layer is a thin film of conductive metal oxide deposited on glass using techniques known in the art. Examples of transparent metal oxides include: ITO, fluorine-doped $SnO_2$, $RuO_2$, and AlZnO. Also, first electrode 110 may comprise a rectangular grid of metal wires or thin metal strips embedded in glass or formed on windshield 150. The term "transparent" used in this specification refers generally to a structure, such as a layer of material or a grid, that transmits about 70 percent or more of incident light without significant diffusion of the light rays. The term "conductive" refers generally to a material having a conductivity similar to that of a common metal or a common semiconductor. Electrical insulator 112 depicted in FIG. 1 may be a region of nonconductive glass formed during fabrication of the windshield, or may be a separate thin film of dielectric insulator material deposited on first electrode 110. The term "nonconductive" refers generally to a material or structure having a conductivity value similar to that of typical electrical insulators or dielectric materials, such as glasses, ceramics, and dielectric polymers. For example, silicon oxide is a common dielectric material that is formed using one of various, standard deposition techniques known in the art. Also, since air is a good insulator, electrical insulator 112 may consist essentially of air, or it may comprise a composite material containing air or other insulating gas. Second electrode 114 in FIG. 1 may be a layer or region of doped, electrically conductive glass formed during fabrication of the windshield. Or, second electrode 114 may be a layer of transparent, conductive material deposited on the outside surface of a windshield 150. Or, second electrode 114 may comprise a rectangular grid of metal wires or thin metal strips embedded in glass or formed on windshield 150 and then covered with a protective insulator layer.

Figure 3:
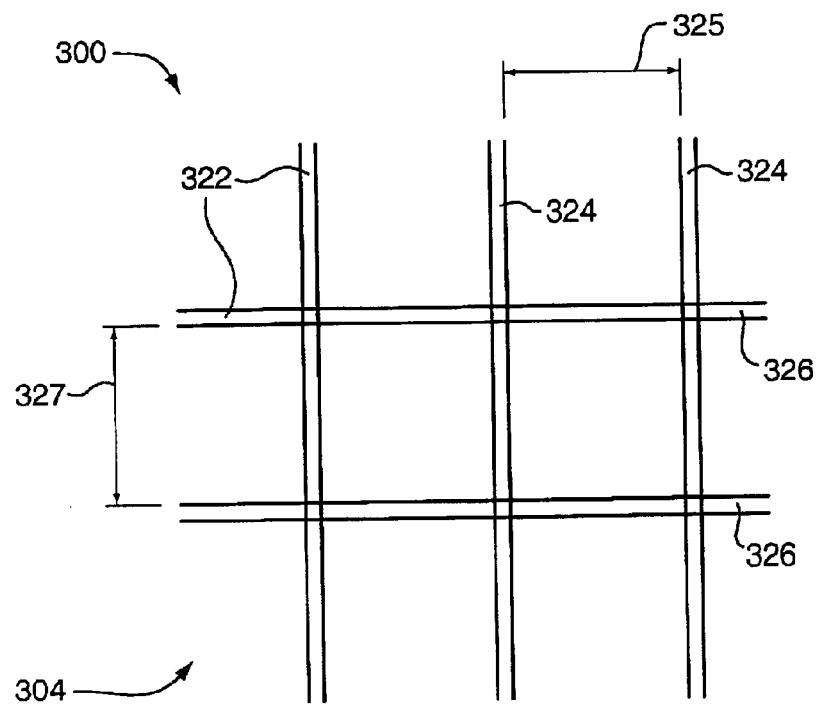
FIG. 3 depicts in schematic form a section of a rectangular grid that functions as a first electrode or a second electrode in accordance with the invention.

FIG. 3 depicts in schematic form a section 300 of a rectangular grid 304 that functions as a first electrode 110 or a second electrode 114. Typically, a rectangular grid 304 is disposed in or on a solid object, such as a windshield, and functions as a first electrode. A second rectangular grid, identical or similar to a rectangular grid 304, is disposed proximate to the first electrode, having the same shape of the first electrode, and separated from the first electrode by an interelectrode distance in accordance with the invention. As depicted in FIG. 1, the first rectangular grid electrode is electrically insulated from the second rectangular grid electrode. Section 300 comprises a plurality of strips or wires 322 (hereinafter "strips") connected to the same terminal of an AC power source (not shown), so that each of the strips has the same voltage bias during operation. Parallel strips 324 are separated from each other usually by first grid spacing 325. Parallel strips 326 are separated from each other by a second grid spacing 327. Typically, grid spacing 325 and grid spacing 327 are about the same and are uniform throughout the grid. Typically, strips 322 have an electrical conductivity of about $10^7$ S/m in order to carry sufficient AC power. Typically, strips 322 comprise a conductive metal, such as titanium. Strips 322 may be embedded in nonconductive glass or other transparent, nonconductive material of a windshield using one of various techniques known in the art. Alternatively, metal strips may be deposited on the nonconductive windshield material using a variety of metal deposition techniques known in the art. Currently, metal strips capable of carrying sufficient AC current are not transparent. Nevertheless, they are sufficiently thin and the grid spacing sufficiently large that light transmission through a windshield is significantly greater than standard minimum requirements. Thus, electrode grid 304 is virtually transparent. Strips 322 used as electrodes in accordance with the invention with a transparent object, such as a windshield, cover as little as about 1–5% of the surface area of the object. Thus, they are essentially invisible and do not interfere significantly with light transmission or with aesthetics. In a typical embodiment, a strip 322 has a width in a range of about from 5 μm to 10 μm, and a depth or thickness in a range of about from 5 μm to 10 μm. A rectangular grid 304 typically has a grid spacing 325 or 327 in a range of about from 50 μm to 1000 μm. When the grid spacing is small, for example, in a system having electrode grids with a grid spacing of 50 μm, a voltage of about 10–50 volts is sufficient. In a coarse grid having a grid spacing of 0.5 mm, a voltage of 100–300 volts is typical.

Figure 4:
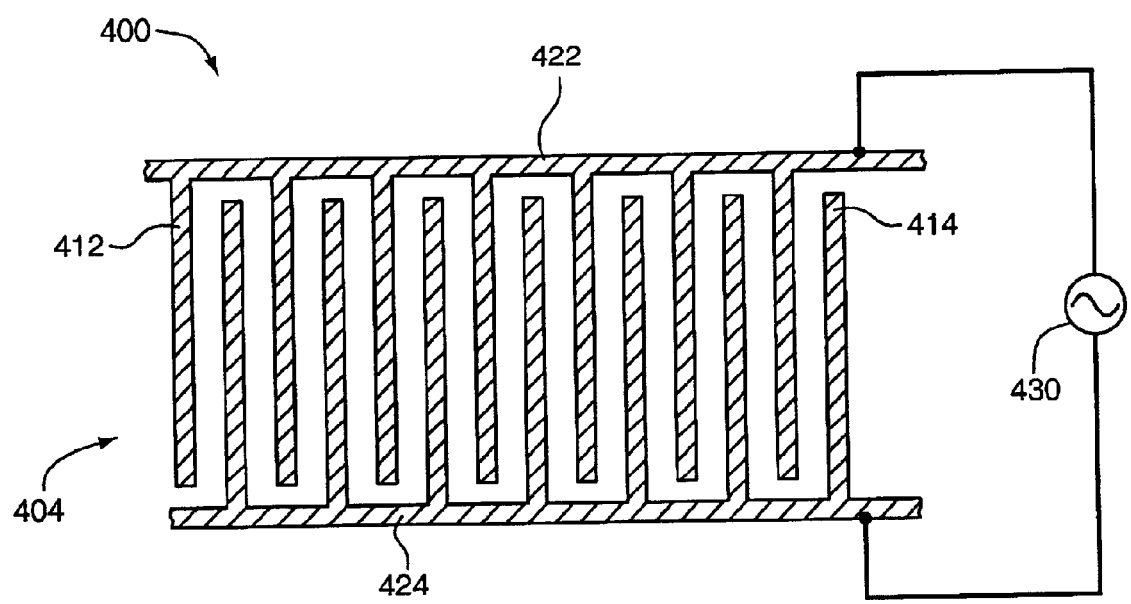
FIG. 4 depicts an embodiment comprising a plurality of interdigitated electrodes.

FIG. 4 depicts in schematic form an alternative embodiment in accordance with the invention. FIG. 4 shows a section 400 of an electrode system 404 comprising a plurality of first electrodes 412 and second electrodes 414, which are interdigitated. The term "interdigitated" means that a plurality of "digits" of a first electrode group are disposed alternately with a plurality of "digits" of a second electrode group. The geometry, dimensions and overall shape of the interdigitated electrodes may vary in different embodiments. Typically, as in FIG. 4, a first electrode stem 422 is disposed proximate to a surface and parallel with a second electrode stem 424, proximate to the same surface. The first electrode stem 422 is connected to one terminal of an AC power source 430, and the second electrode stem 424 is connected to a second terminal of power source 430, so that the first electrode stem and the second electrode stem have opposite polarities. A series of first electrode "digits" 412 extend in a substantially normal direction from first electrode stem 422 towards second electrode stem 424, without touching the second electrode stem. Similarly, a series of "digits" 414 of second electrode stem 424 extend in a substantially normal direction from the second electrode stem towards the first electrode stem, without touching the first electrode stem. First electrodes 412 are spaced so that the digits are adjacent to and substantially parallel with second electrode digits 414. As a result of the alternating arrangement of interdigitated electrodes 412, 414, an electrode having one polarity at a given moment is adjacent to one or more electrodes having the opposite polarity. Alternatively, either one of the electrode stems is connected to electrical ground, and the other is connected to an AC power source, so that a potential difference is generated between adjacent electrodes. Thus, in this specification, language referring to an AC voltage across electrodes and to electrodes having opposite polarity, as well as other similar language, has its general meaning, including: a) an electrode connected to electrical ground, and in AC voltage applied to another electrode; b) an AC voltage applied to both a first electrode and a second electrode, in which the potential bias on the first electrode is approximately 180 degrees out of phase with the potential bias on the second electrode. In preferred embodiments, electrodes 412, 414 and electrode stems 422, 424 are covered by electrical insulation so that neither water nor ice provide a path for electrical conduction between electrodes 412, 414. Instead, ice typically forms on the insulation, and the AC voltage difference between first electrode 412 and second electrode 414 creates a strong AEF. The interfacial ice absorbs capacitive energy from the AEF, which causes an AC current in the interfacial ice.

Figure 5:
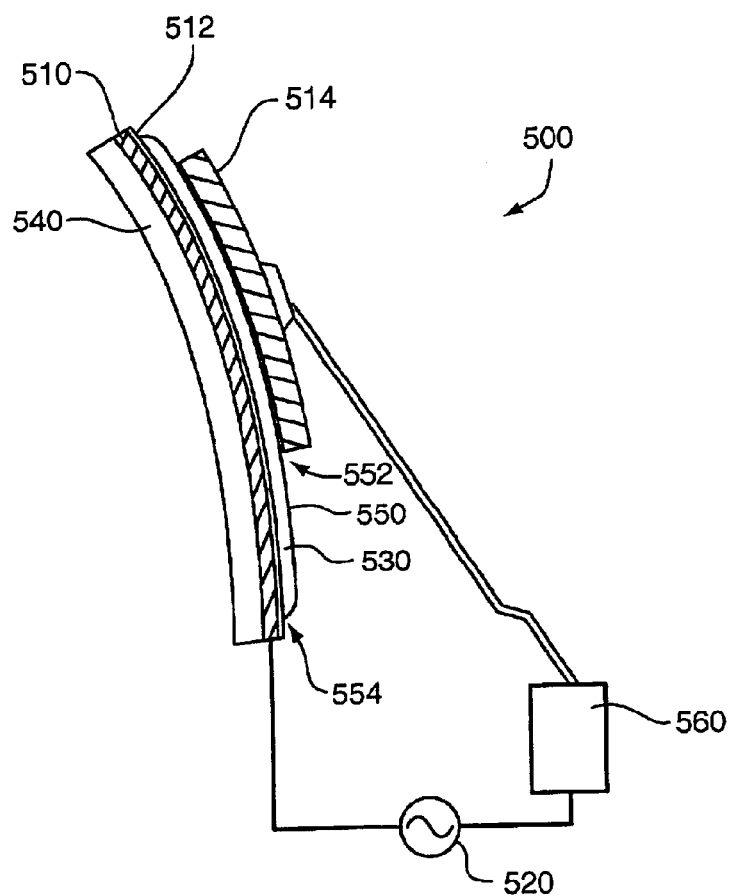
FIG. 5 depicts in schematic form a system in accordance with the invention having a first electrode, an electrical insulator, and a second electrode, in which a conductive windshield wiper functions as the second electrode.

FIG. 5 depicts in schematic form a system 500 in accordance with the invention. System 500 includes a first electrode 510, an electrical insulator 512, and a second electrode 514. First electrode 510 and second electrode 514 are each connected to opposing terminals of AC power source 520. FIG. 5 further depicts an ice layer 530 located between electrical insulator 512 and second electrode 514. First electrode 510 may be a layer of conductive glass forming the outside surface of windshield 540. Alternatively, first electrode 510 may be a layer of conductive material deposited on the outside surface of windshield 540 using deposition techniques known in the art. Typical conductive materials include thin films of metal oxides deposited using known techniques. Alternatively, first electrode 510 may be a rectangular grid of conductive strips, typically metal strips, as described with reference to FIG. 3. Insulator layer 512 is typically a region of nonconductive glass or a layer of electrically insulating, dielectric material deposited as a layer over first electrode 510. In system 500, second electrode 514 is a conductive windshield wiper, typically comprising electrically conductive rubber. Deicing in accordance with the invention is accomplished by using power source 520 to apply an AC voltage across first electrode 510 and second electrode 514. The AC voltage creates an AEF with capacitive AC current that generates conductivity (resistive) AC current in the interfacial ice at the contact interfaces of ice layer 530. Ice layer 530 has an air-ice contact interface 550, an ice-solid contact interface 552 at the interface between second electrode 514 and ice layer 530, and an ice-solid contact interface 554 at the interface between ice layer 530 and electrical insulator 512. Resistive AC current that melts interfacial ice is generated by the AEF at the ice-solid contact interfaces 552, 554 below second electrode 514. Melting of interfacial ice at interfaces 550 and 552 does not contribute significantly to removing ice layer 530 from windshield 540. Rather, melting of interfacial ice principally at contact interface 554 contributes to deicing of windshield 540 (or other solid object being protected).

During operation, windshield-wiper electrode 514 moves across windshield 540 in a sweeping motion. As a windshield wiper covers a particular region of the windshield creating an AEF and that region, a portion of the capacitive AC energy of the AEF is transformed into resistive AC current in the interfacial ice in that region. The resistive AC current generates Joule heat that melts the interfacial ice. Through gravity or by the sweeping motion of the windshield wiper, ice 530 is removed from the windshield. After ice 530 is removed, the electrical power dissipated in system 500 decreases because there is virtually no water or ice present for conducting resistive AC current. Thus, system 500 is partly self-regulating. An optional voltage regulator 560 may be included in system 500 and used to decrease the AC voltage supplied by power source 520 after ice layer 530 has been removed. Various techniques are known in the art for detecting the presence and absence of ice. Depending on atmospheric conditions, approximately 1 kW of power is required to deice a windshield having a surface area of about 1 m². After deicing has been accomplished, about 200–300 W/m² of power is sufficient to maintain the surface of a windshield ice-free.

Since the time of contact of the moving windshield wiper at a given location on the windshield is relatively short, compared to a system in which both electrodes are stationary, the voltage required to provide suitable heating power is typically higher than in systems in which both electrodes are stationary.

Figure 6:
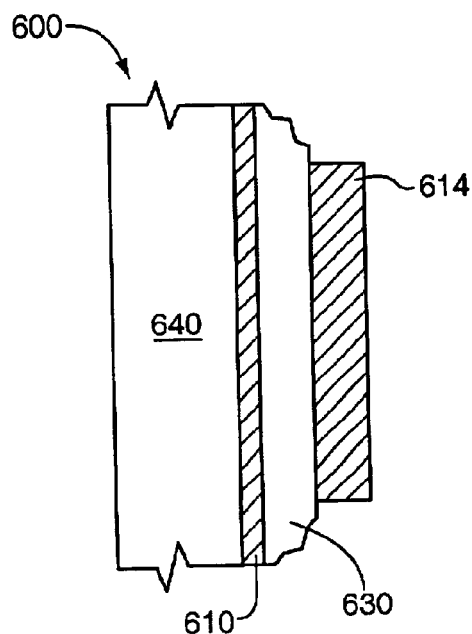
FIG. 6 depicts a system in accordance with the invention that does not include a permanent electrical insulator.

FIG. 6 depicts a system 600 in accordance with the invention, but which is less preferred. System 600 includes a first electrode 610 covering nonconductive glass windshield 640, and a second electrode 614. System 600 does not include a permanent electrical insulator. Instead, during operation, ice layer 630 functions to insulate electrically first electrode 610 from second electrode 614. If no ice is present at a particular spot of first electrode 610 or after ice 630 has been removed in accordance with the invention from windshield 640, first electrode 610 and second electrode 614 are electrically "shorted". As a result of "shorting", electrical power consumption is higher in a system 600 than in system 500 as depicted in FIG. 5.

Figure 7:
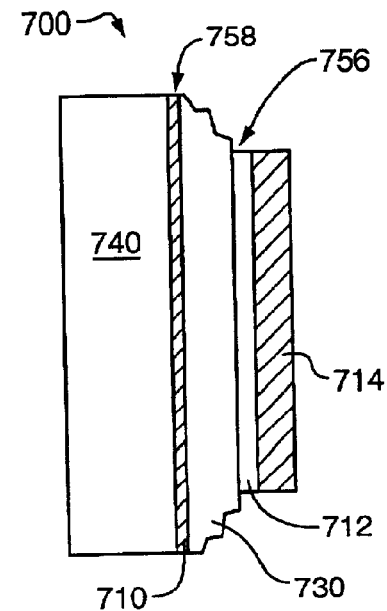
FIG. 7 depicts a system in accordance with the invention in which the second electrode is a conductive portion of a windshield wiper, and a windshield-wiper blade is an electrical insulator.

FIG. 7 depicts in schematic form a system 700 in accordance with the invention. System 700 includes a first electrode 710 and a second electrode 714. Second electrode 714 is a conductive portion of a windshield wiper; for example a conductive metal bracket holding a rubber windshield-wiper blade. System 700 also includes electrical insulator 712, which is a windshield-wiper blade comprising electrically nonconductive rubber. First electrode 710 is typically a region of conductive glass at the outside surface of windshield 740. Alternatively, first electrode 710 is a transparent or virtually transparent layer of conductive material; for example, a thin film of metal oxide deposited using techniques known in the art. FIG. 7 depicts an ice layer 730 located between first electrode 710 and rubber windshield-wiper insulator 712. An AC voltage applied across first electrode 710 and second electrode 714 creates an AEF that generates a resistive AC current in the interfacial ice of ice layer 730. An ice-solid contact interface 756 exists at the interface between rubber insulator 712 and ice layer 730. Another ice-solid contact interface 758 exists at the interface between first electrode 710 and ice layer 730. As windshield-wiper electrode 714 sweeps across windshield 740, it creates an AEF between first electrode 710 and second electrode 714 in the region corresponding to contact interfaces 756, 758. The resistive AC current generated by the AEF in the interfacial ice at interfaces 756, 758 causes Joule heating, which melts the interfacial ice. As a result of melting of interfacial ice at contact interface 758, ice layer 730 is removed from windshield 740 through gravity or by the sweeping motion of windshield-wiper blade 712.

FIG. 8 depicts in schematic form a further embodiment in accordance with the invention. The system 800 includes a first electrode 810 and a second electrode 814. As depicted in FIG. 8, first electrode 810 typically comprises conductive glass or other transparent conductive material of the windshield 840. Second electrode 814 is a conductive portion of a windshield wiper; typically a conductive metal bracket holding a rubber windshield-wiper blade. System 800 further comprises an electrical insulator 812 and an electrical insulator 813. Electrical insulator 812 is located on top of first electrode 810. Electrical insulator 812 is a region of nonconductive material covering first electrode 810. Electrical insulator 812 may be formed in various ways. For example, electrical insulator 812 may be nonconductive glass formed during fabrication of glass windshield 840. Alternatively, electrical insulator 812 may be a layer of nonconductive material, for example, silicon oxide, deposited on first electrode 810 using one of a variety of techniques known in the art. Electrical insulator 813 typically comprises nonconductive rubber in a windshield-wiper blade. In FIG. 8, an ice layer 830 covers windshield 840 and is located between first electrode 810 and second electrode 814. Ice layer 830 has a contact interface 856 with electrical insulator 813. Ice layer 830 also has a contact interface 858 with electrical insulator 812. During operation, an AC voltage applied across first electrode 810 and second electrode 814 creates an AEF that generates resistive AC current in the interfacial ice at contact interfaces 856 and 858 in the region in which second electrode 814 is located as it sweeps across windshield 840.

Numerous variations of the embodiments described herein may be fabricated and used in accordance with the invention.

EXAMPLE 1

A system 900 in accordance with the invention was used for melting interfacial ice. System 900 included a plurality of first electrodes 912 and second electrodes 914. Electrodes 912, 914 were interdigitated, as depicted in FIG. 9. Interdigitated electrodes 912, 914 were formed on nonconductive glass substrate 916, which had a thickness of about 2 mm. Interdigitated electrodes 912, 914 comprised strips of chromium metal. Interdigitated electrodes 912, 914 were about 25 μm wide and had a thickness of about 100 nm. The interelectrode distance between adjacent electrodes 912, 914 was about 500 μm. The plurality of interdigitated first and second electrodes 912, 914 were located in a total surface area on substrate 916 of about 5 cm×5 cm. The metal strips of electrodes 912, 914 occupied about five percent of the total surface area. First electrode stem 922 and second electrode stem 924 were connected to opposing terminals of AC power source 930.

A disc of ice 925 having a diameter of approximately 4 cm was formed on substrate 916, on top of and covering interdigitated first and second electrodes 912, 914, as represented by the circle of dashes 925 in FIG. 9. Ice disc 925 had a thickness of approximately 3 mm. The system was frozen at −10° C. An AC voltage of 150 volts (rms) at a frequency of 10 kHz was applied to first and second electrodes 912, 914 through electrode stems 922, 924, respectively, using power source 930. The ice at the ice-glass interface immediately melted, and ice disc 925 slid away from substrate 916 under its own weight. Electrical measurements showed that the maximum heating power did not exceed 2.5 W, which corresponded to a heating power density, $W_h$, not exceeding 0.1 W/cm$^2$.

FIG. 10 depicts in schematic form a system 950 in accordance with the invention. System 950 includes a plurality of interdigitated electrodes 960, as described above with reference to FIGS. 4 and 9. Interdigitated electrodes 960 are disposed on the outside surface of solid object 970, typically a transparent windshield 970. System 950 also includes electrical insulator 972 formed on and covering electrodes 960. Insulator 972 contributes to electrical insulation of each electrode 960 from the other electrodes 960. Interdigitated electrodes 960 are connected electrically to AC power source 974, which provides a voltage bias of opposite polarity to adjacent electrodes during operation. A system 950 is useful for removing ice 976 located on insulator 972 and covering windshield 970. Melting of interfacial ice at ice interface 978 at the interface of ice 976 and insulator 972 reduces the adhesion of ice layer 976 to insulator 972. As a result, ice layer 976 falls by gravity from the windshield 970, or is easily removed by wind friction or by the sweeping action of windshield wiper 980.

A method and a system in accordance with the invention for melting interfacial ice may be used to remove ice in various applications, especially in applications involving surfaces of transparent solid objects, such as windshields. Although the embodiments have been described principally with regard to windshields, the structures and methods herein described are applicable to removal of ice in general, and in particular the removal of ice from the surfaces of solid objects. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above apparatus and methods without departing from the scope of the invention, it is intended that all subject matter contained in the above description or shown in the accompanying drawing be interpreted as illustrative and not in a limiting sense. Consequently, the invention is to be construed as embracing each and every novel feature and novel combination of features present in or inherently possessed by the systems, methods and compositions described in the claims below and by their equivalents.

We claim:

1. A system for melting interfacial ice, comprising:
a first electrode embedded into or coated onto an object to be protected from ice formation;
a second electrode, the first electrode and the second electrode defining an interelectrode space between the first electrode and the second electrode, the first electrode and the second electrode defining an interelectrode distance that separates the first electrode and the second electrode; an electrical insulator located in the interelectrode space, wherein the insulator comprises a nonconductive rubber windshield wipe blade; and
an AC power source for providing an AC voltage across the first and second electrodes having a frequency greater than 1000 Hz and less than 300 KHz wherein the interfacial ice is melted upon application of the AC voltage.

2. A system as in claim 1, wherein the AC power source provides an AC voltage in a range of about from 10 volts to 500 volts.

3. A system for melting interfacial ice, comprising:
a first electrode embedded into or coated onto an object to be protected from the formation,
wherein the first electrode comprises a layer of conductive glass; a second electrode, the first electrode and the second electrode defining an interelectrode distance that separates the first electrode and the second electrode; and
an AC power source for providing an AC voltage across the first and second electrodes having a frequency greater than 1000 Hz and less than 300 KHz wherein the interfacial ice is melted upon application of the AC voltage.

4. A system as in claim 3, wherein the interelectrode distance has a value in a range of about 50 82m to 500 μm.

5. A system as in claim 3, wherein the interelectrode distance has a value less than 50 82 m.

6. A system as in claim 3, wherein the interelectrode distance has a value greater than 500 82 m.

7. A system as in claim 3, wherein the AC power source provides an AC voltage in a range of about 10 volts to 500 volts.

8. A system for melting interfaceial ice, comprising:
a first electrode embedded into or coated onto an object to be protected from ice formation;
a second electrode, the first electrode and the second electrode defining in interelectrode distance that separates the first electrode and the second electrode,
wherein the second electrode comprises a layer of conductive glass; and an A/C power source for providing an AC voltage across the first and second electrode having a frequency greater than 1000 Hz and less than 300 KHz wherein the interfacial ice is melted upon application of the AC voltage.

9. A system as in claim 8, wherein the AC power source provides an AC voltage in a range of about rom 10 volts to 500 volts.

10. A system as in claim 8, wherein the interelectrode distance has a value in a range of about from 50 82 m to 500 82 m.

11. A system as in claim 8, wherein the interelectrode distance has a value less than 50 82 m.

12. A system as in claim 8, wherein the interelectrode distance has a value greater than 500 82 m.

13. A system for melting interfacial ice, comprising:
a first electrode embedded into or coated onto an object tobe protected from ice formation,
wherein the first electrode comprises a transparent conductive metal oxide; a second electrode, the first electrode and the second electrode defining an interelectrode distance that separates the first electrode and the second electrode; and an AC power source for providing an AC voltage across the first and second electrodes having a frequency greater than 100 Hz and less than 300 KHz wherein the interfacial ice is melted upon application of the AC voltage.

14. A system as in claim 13, wherein the AC power source provides an AC voltage in a range of about 10 volts to 500 volts.

15. A system as in claim 13, wherein the interelectrode distance has a value in a range of about 50 82 m to 500 82 m.

16. A system as in claim 13, wherein the interelectrodes distance has a value less than 50 82 m.

17. A system as in claim 13, wherein the interelectrode distance has a value greater than 500 82 m.

18. A system for melting interfacial ice, comprising:

a first electrode embedded into or coated onto an object to be protected from ice formation, wherein the first electrode comprises a conductive grid and the conductive grid includes metal strips:

a second electrode, the first electrode and the second electrode defining an interelectrode distance that separat the first electrode and the second electrod; and an AC power source for providing an AC voltage across the first and second electrodes having a frequency greater than 1000 Hz and less than 300 KHz wherein the interfacial ice is melted upon application of the AC voltages.

19. A system as in claim 18, wherein the second electrode comprises a conductive grid.

20. A system for melting interfacial ice, comprising:

a first electrode embedded into or coated onto an object to be protected from ice formation;

a second electrode, the first electrode and the second electrode defining an interelectrode distance that separates the first electrode and the second electrode, wherein the second electrode comprises a conductive rubber windshield wiper blade; and an AC power source for providing an AC voltage across the first and second electrodes having a frequency greater than 1000 Hz and less than 300 KHz wherein the interfacial ice is melted upon application of the AC voltage.

21. A system as in claim 20, wherein the AC power source provides an AC voltage in a range of about 10 volts to 500 volts.

* * * * *

UNITED STATES PATENT AND TRADEMARK OFFICE
CERTIFICATE OF CORRECTION

PATENT NO. : 7,087,876 B2 Page 1 of 1
APPLICATION NO. : 09/976210
DATED : August 8, 2006
INVENTOR(S) : Victor F. Petrenko It is certified that error appears in the above-identified patent and that said Letters Patent is hereby corrected as shown below:

Column 6, line 11, "AC voltage across" should read --AC voltage in a range of from 0.5 to 300 KHz--; lines 50-51, the words "capacitive energy of the" should be deleted;

Column 14, line 15, claim 4, "about 50 82m" should read --about 50 $\mu$m--; line 17, claim 5, line 43, claim 11, and 65, "than 50 82 m" should read --than 50 $\mu$m--; line 19, claim 6, lines 45 and 67, claim 12, "than 500 82 m" should read --than 500 $\mu$m--; line 24, claim 8, "interfaceial ice" should read --interfacial ice--; line 32, claim 8, "and second electrode" should read --and second electrodes--; lins 40-41, claim 10, "from 50 82 m to 500 82 m" should read --from 50 $\mu$m to 500 $\mu$m--; line 48, claim 13, "tobe protected" should read --to be protected--; line 55, claim 15, "100 Hz" should read --1000 Hz--; line 62-63 claim 15 "about 50 82 m to 500 82 m" should read --about 50 $\mu$m to 500 $\mu$m--;

Column 15, lines 9-10, claim 18, "that separat the first electrode and the second electrod;" should read -- that separate the first electrode and the second electrode;--

Signed and Sealed this

Sixteenth Day of October, 2007

JON W. DUDAS
*Director of the United States Patent and Trademark Office*